(No Model.)
J. M. VANCE.
GRAPPLING OR BALE HOOK.
No. 245,032. Patented Aug. 2, 1881.
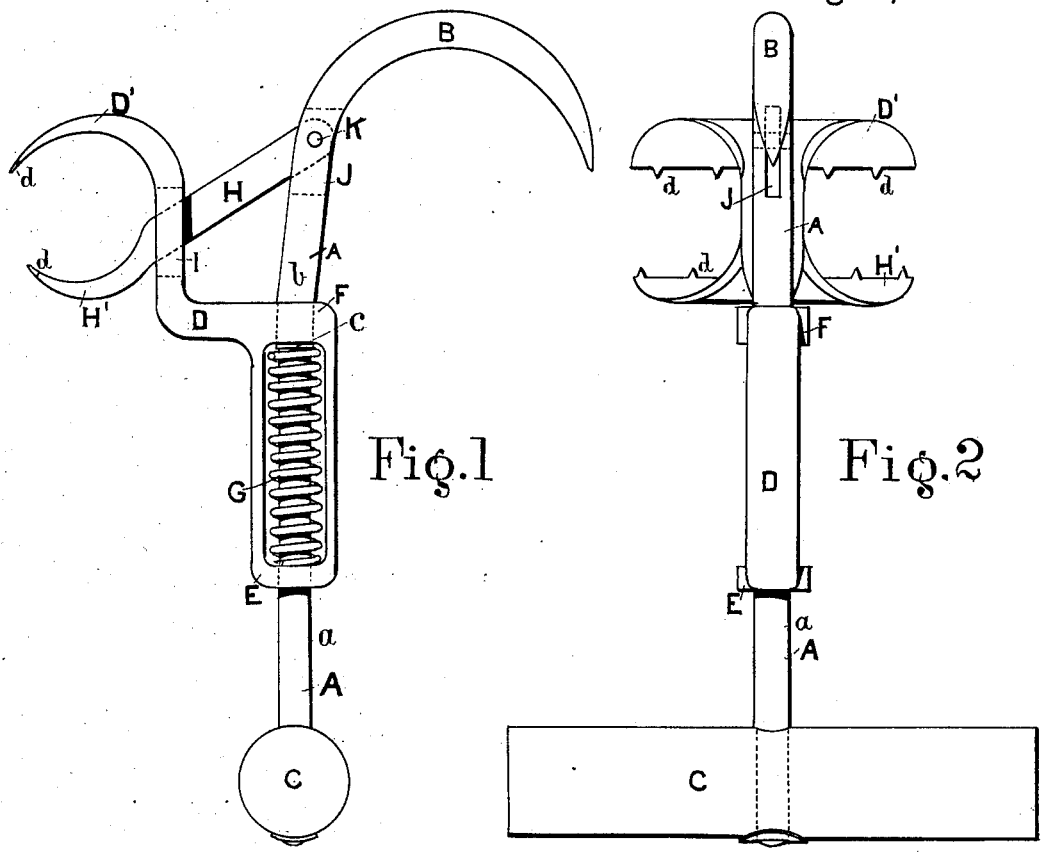
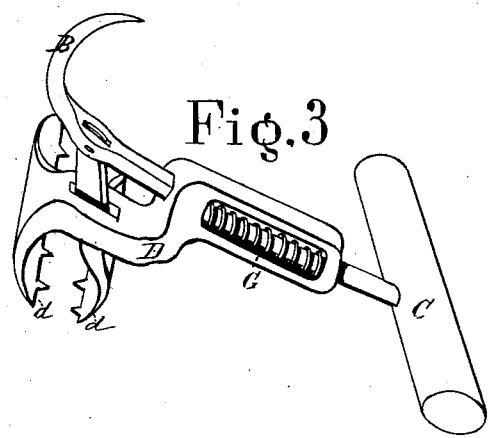
Witnesses
W. R. Hughes.
Charles Monmonier
Inventor
John M. Vance
by George Pardy
his Atty
N. PETERS, Photo-Lithographer, Washington, D. C.

United States Patent Office.

JOHN M. VANCE, OF EUREKA, CALIFORNIA.

GRAPPLING OR BALE HOOK.

SPECIFICATION forming part of Letters Patent No. 245,032, dated August 2, 1881.

Application filed December 18, 1880. (No model.)

*To all whom it may concern:*

Be it known that I, JOHN M. VANCE, of Eureka, Humboldt county, State of California, have invented a new and useful Grappling or Bale Hook for use of stevedores, warehousemen, and others who handle bale-goods, grain in sacks, or any merchandise which is contained in sacks, bags, or covers composed of burlaps or other similar material, of which the following is a specification.

My invention relates to a device which, in some cases, is intended to take the place of the sharp-pointed bale-hook which is used most commonly by dock-laborers when loading and unloading vessels, to enable them to obtain a hold upon packages as they are lowered by the slings, so as to guide them to their desired place of landing, this bale-hook being also used on many occasions in handling and shifting packages by warehousemen and others.

The occasions upon which my device is intended to supplant the bale-hook above named are when the packages are inclosed in burlaps, gunny-sacks, or similar coverings, and are liable to be torn or damaged in using the bale-hooks before named.

My device is illustrated in the accompanying drawings, in which Figure 1 is a side view. Fig. 2 is a front view. Fig. 3 is a perspective view.

Similar letters refer to similar parts throughout the several views.

My device may be an instrument independent in itself, as some would prefer, or may be combined with the common bale-hook before named, in which combination I will here describe it.

A is the shank of an ordinary bale-hook as now in use, B being the hook with sharp point available for use on wooden cases, &c. Upon this shank A, I apply a peculiar device which I call my "grappling" claws or clips, which operate so as to draw together, pinch tightly, and hold a wrinkle of the burlap covering of a package, instead of making a hole through it as the common bale-hook does. These clips are formed of an upper and lower claw drawn together to pinch the burlaps by pulling upon the handle C, said claws opening apart automatically by the action of a spring, by relaxing the pull or ceasing it entirely. The upper clip, D, is made to slide back and forth upon a shank, A. Where it does so, it has a shape exactly like the turn-buckle of a hog-chain; only, instead of having any screw-threads cut in the top and bottom bosses, E and F, the bottom boss, E, has a round hole through its center to fit loosely the round part $a$ of the shank, and the upper boss, F, has a square hole to fit the square part $b$, so as to prevent turning on the shank.

There is a spiral spring, G, which fills the space between the bosses E and F. It bears against the lower boss, E, at one end, and against a shoulder formed on the shank A, at $c$, where the round part of the shank ceases and the square part commences, the square part being made a trifle larger than the round part.

From the side of the upper boss, F, the shank of the upper clip, D, projects about three-fourths of an inch at a right angle to the shank A. It then turns sharply upward at a right angle and is prolonged about one inch and a half parallel with the shank A. Finally it makes another sharp turn at a right angle outward and terminates in a broad, flat, hoe-shaped toothed claw, D', about two and a half inches across its face, and having five or six little sharp teeth, $d$, on its edge, a clear idea of the shape of which claw may be obtained from the drawings forming part of this specification.

The lower clip, H, like the upper clip, has its broad-faced toothed claw H' facing so as to engage with the upper claw, D', and the teeth on the edge of each claw should occur so as to match with the spaces between the teeth of the opposing claw. This clip H has a shank which passes loosely through a slot, I, cut in the shank of the clip D, and into a slot, J, cut in the shank A, where it is held by a fulcrum-pin or rivet, K, which passes through the shank A and the shank of the clip H.

It will be noticed in the drawings that the square part of the shank A does not continue directly in line with the round part, but deflects a little back. This is intended for the purpose of giving a compound motion to upper claw, D', believed to be necessary to enable it to perform its function perfectly, the idea being to force the claw out a little by this crook in the stem A when the operator pulls the instrument toward him, so that a wrinkle of the burlap may be formed.

The wooden handle C may be fastened on the stem A in a variety of ways. I have shown the shank passing through with a square end to prevent the handle from turning, a washer being put on projecting end of shank which is afterward riveted over said washer.

In putting together the different parts I proceed as follows: First, take the upper clip, D, and insert the spring G between the bosses E and F; then slip the shank A through the boss F, the coil of the spring, and the lower boss, E; next, pass the shank of the clip H through the slot I in shank of clip D and into slot J in shank A; then insert fulcrum-pin K and rivet it up; finally, fix on the wooden handle.

What I claim as my invention, and desire to secure by Letters Patent, is—

The improved bale or grappling hook, consisting of the combination of the clips D and H, spring G, and stem A, as herein described, and for the purpose set forth.

JOHN M. VANCE.

Witnesses:
T. H. Foss, Jr.,
J. P. Monroe.